United States Patent
Sha et al.

(10) Patent No.: US 6,574,686 B1
(45) Date of Patent: Jun. 3, 2003

(54) METHOD FOR OVERCOMING FAULTS IN AN ATM I/O MODULE AND LINES CONNECTED THERETO

(75) Inventors: Yung-Ching Sha, Edison, NJ (US); Pramod V. N. Koppol, Aberdeen, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/444,154

(22) Filed: Nov. 20, 1999

(51) Int. Cl.[7] .............................. G06F 3/00; G01R 31/08
(52) U.S. Cl. ........................................ 710/38; 370/217
(58) Field of Search ..................... 710/36, 38; 370/220, 370/219, 227, 228, 217

(56) References Cited

U.S. PATENT DOCUMENTS 5,069,521 A * 12/1991 Hardwick
5,870,382 A * 2/1999 Tounai et al.
6,466,576 B2 * 10/2002 Sekine et al. ............ 370/395.1

* cited by examiner

*Primary Examiner*—Jeffrey Gaffin
*Assistant Examiner*—Niketa Patel

(57) ABSTRACT

An arrangement having a service fiber and a protection fiber connected to different I/O modules that are connected to an ATM switch. The switching functions necessary for achieving protection are realized through cooperation between the CPUs on the I/O modules of the service and the protection lines and the ATM switch fabric. The line selected has its frame buffer open, while the line in the standby mode has its frame buffer closed. In the other direction, traffic is multicast onto both the service and the protection lines by the ATM processing unit. In this manner, the protection fiber always contains information, ready to be switched from standby mode into active mode.

18 Claims, 4 Drawing Sheets

LEGEND:
A SERVICE LINE TO DESTINATION 1
B SIMPLEX LINE TO DESTINATION 2
C PROTECTION LINE TO DESTINATION 1
D SIMPLEX LINE TO DESTINATION 3

METHOD FOR OVERCOMING FAULTS IN AN ATM I/O MODULE AND LINES CONNECTED THERETO

BACKGROUND OF THE INVENTION

This invention relates to ATMs and, more particularly to circumventing of faults in I/O modules of an ATM.

FIG. 1 presents a general block diagram of a conventional local ATM switch 100 with a connected I/O module 10, and conventional remote ATM switch 200 with a connected I/O module 20 (that may be of the same construction as that of module 10). Module 10 contains a line interface unit (LIU) 110 that is connected to fiber 210, and a line interface unit 120 that is connected to fiber 220. Fiber 210 is the "service" line, in the sense that it carries live data between I/O module 10 and I/O module 20. Fiber 220 is the "protection" line, in the sense that it is ready to assume the active communication function of line 210, should fiber 210 fail. Within module 10, LIU 110 is connected to framer 111, and framer 111 is connected to APS switch unit 130. Similarly, LIU 120 is connected to framer 121, and framer 121 is connected to APS switch unit 130. APS switch 130 is connected to ATM processing unit 140, and the output of ATM processing unit 140 forms the output of I/O module 10. This output is connected to ATM switch fabric 100. Elements 111, 121, 130 and 140 are connected to a control CPU 150. Additionally, CPU 150 includes an ATM bus through which the CPU communicates directly with switch fabric 100 (not shown explicitly).

Under normal operating circumstances, traffic from the service fiber (210) passes through LIU 110 and framer 111, and is applied to APS switch unit 130. The switch is set to pass this traffic to ATM processing unit 140 and thence, to ATM switch fabric 100. In the reverse direction, traffic flows from switch fabric 100 to ATM processing unit 140, and is bridged by APS switch unit 130 to both framers 111 and 121. That traffic is then transmitted out on both fibers 210 and 220. From the above it can be realized that protection fiber 220 carries signals that are identical to the signals carried in service line 210. The only difference is that APS switch 130 in I/O module 10 passes only the signal of framer 111 to switch unit 140 and, similarly, I/O module 20 at the remote destination passes only the signal of framer 123 to switch unit 145.

When a failure occurs, for example, when fiber 210 is severed, CPU 150 gets an interrupt signal via line 151 from a detector in framer 111. In response thereto, the CPU takes recovery action. First, the CPU checks to determine whether the protection line (220) is in good operating order. Upon an affirmative determination, CPU 150 orders APS switch 130 to disconnect the path from line 210 toward ATM processing unit 140, and to connect the path from line 220 to ATM processing unit 140. CPU 150 also creates an APS signal and casts it onto line 220 through framer 121, toward I/O module 20. Framer 113 at I/O module 20 provides the received APS signal to CPU 160, and CPU 160 directs APS switch unit 135 to switch the signal arriving on fiber 220 to ATM processing unit 145.

In may be noted that fibers 210 and 220 may each be a pair of fibers for carrying the two-directional traffic, or they may each be single fibers (with the two channels multiplexed thereon using, for example, wavelength division multiplexing).

While an ATM constructed with I/O modules as shown in FIG. 1, and employed in the manner described above, is able to circumvent problems that originate in the fiber or the LIU, it nevertheless had a significant weakness. Use of the APS switch within the I/O module requires one to connect the service fiber and the protection fiber to the same I/O module. Consequently, a general failure in the I/O module brings down both the service path and the protection path. On first blush, it would appear that placing the APS switch off the I/O module, in a separate circuit board that is interfaced between the I/O module and the ATM switch, would solve the problem because it would allow the service fibers and the protection fibers to be connected to different I/O modules. Alas, current design ATMs do not have the physical room for inserting the circuit board that would serve as the switches for selecting I/O modules. Moreover, such a solution is quite expensive.

SUMMARY OF THE INVENTION

An improved arrangement is realized by operating in a novel manner that allows the connection of the service fiber and the protection fiber to different I/O modules and achieving the necessary switching functions without the need of additional circuit boards. More specifically, while the service line and the protection line are connected to different I/O modules, the selection of the service line or the protection line is carried out by cooperation between the CPUs on the I/O modules of the service and the protection lines and the ATM switch fabric. The line that is selected has its framer buffer open, while the line that is in the standby mode has its framer buffer closed. In the other direction, traffic is multi-cast onto both the service and the protection lines by the ATM processing unit. In this manner, the protection fiber always contains information, ready to be switched from standby mode into active mode.

DETAILED DESCRIPTION

Figure 1:
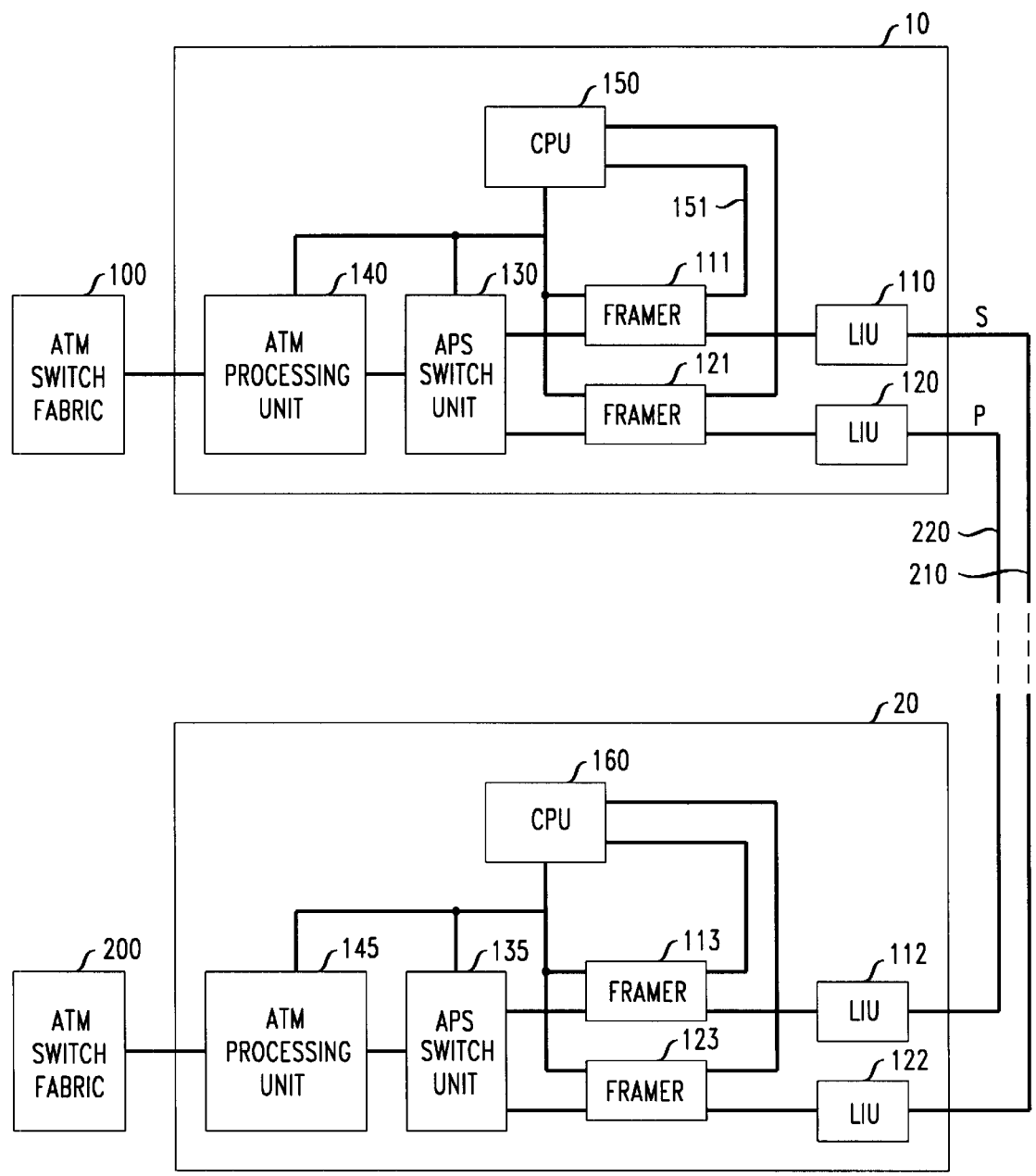
FIG. 1 illustrates a prior art ATM arrangement.
Figure 2:
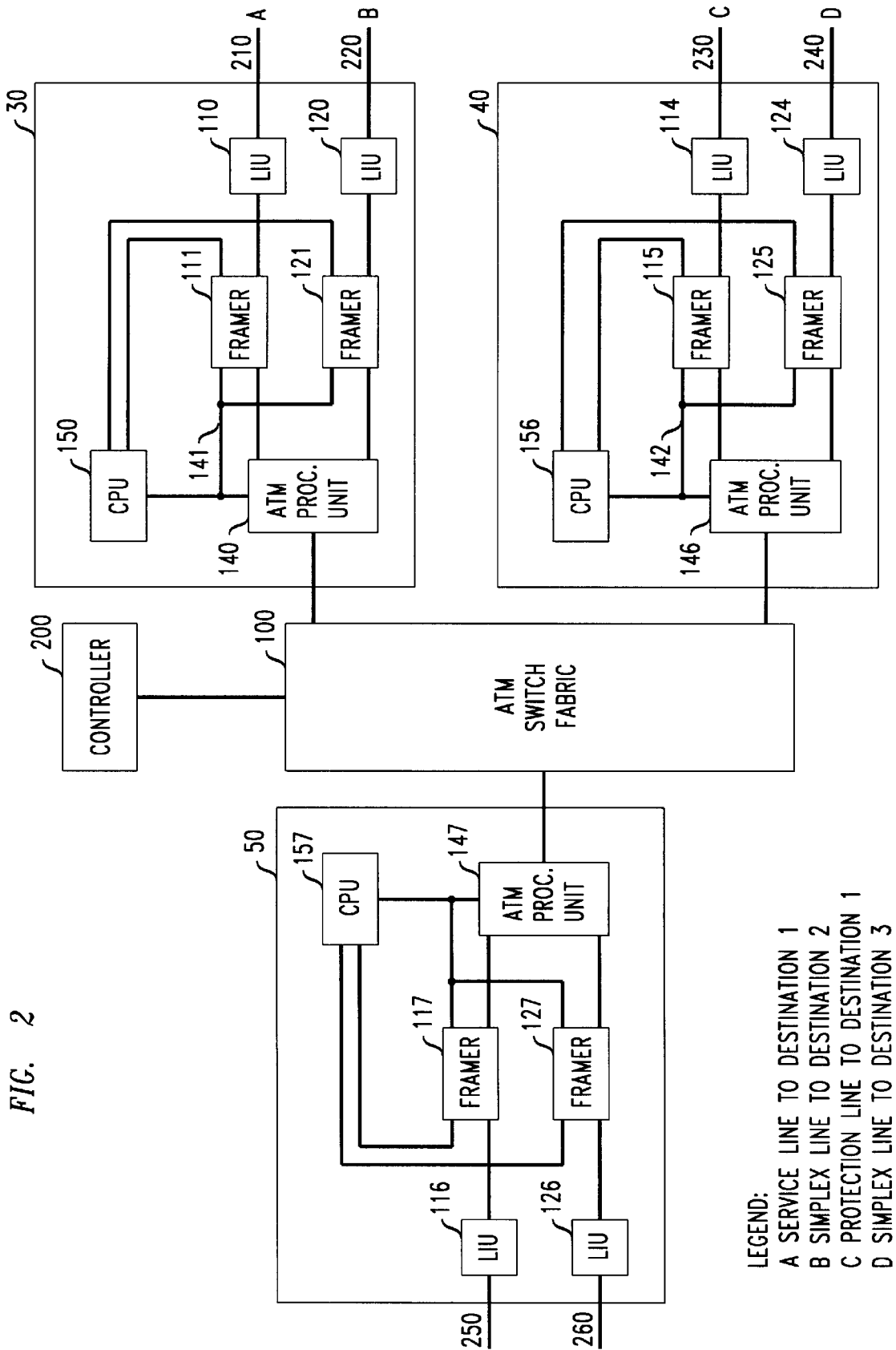
FIG. 2 presents an arrangement that comports with the principles of this invention.

FIG. 2 presents an ATM arrangement in accordance with the principles of this invention. It shows an ATM switch 100 and associated I/O modules 30, and 40 and 50. Modules 30–50 differ from module 10 in that APS switch unit 130 is effectively not found in these modules. Unlike in the prior art arrangement shown in FIG. 1, the service fiber and the protection fiber in the FIG. 2 arrangement are connected to different modules. Illustratively, FIG. 2 has one duplex span to the right of ATM switch 100 that includes a service line and a protection line, and two simplex spans that do not have protection lines. To the left of ATM switch 100 there are two simplex spans. The service line of the duplex span is connected from I/O module 30 to destination 1 via fiber 210. The protection line of the duplex span is connected from I/O module 40, also to destination 1, via fiber 230. Fiber 220 is connected to LIU 120 of I/O module 30 and it forms a simplex span to a destination 2. Similarly, fiber 240 is connected to LIU 124 of I/O module 40 and it forms a simplex span to a destination 3. Fibers 250 and 260 are connected to LIUs 116 and 126, respectively, of I/O module 50.

The following exposition considers only the operation of the duplex span. However, before proceeding with this exposition, it may be noted that, as indicated above, each framer includes a detector to detect loss of signal or loss of framing. Each framer also includes a buffer that can be closed or opened, so as to block the buffer from outputting any signals, or to allow signals to flow out, respectively. The CPU of the I/O module provides the signal that controls the state of the buffer. Illustratively, the state of the buffer in framer 111 is controlled by a signal that flows on bus 141.

During normal operating conditions, live data flows through fiber 210 (the service line) and LIU 110 into framer 111. This data is transferred to ATM processing unit 140 and thence to ATM switch 100. The same data is also present in fiber 230 (the protection line) but this data is blocked by an appropriate control signal on bus 142. Thus, ATM switch 100 receives only one stream of data. Presuming that the data that does reach ATM switch 100 (from I/O module 30) is addressed to framer 117 in I/O module 50, ATM switch 100 makes the transfer, and the data flows to framer 117 and thence, to fiber 250 through LIU 116. In the reverse direction, two payload data streams are created from the data of framer 117 by use of a multicast integrated circuit that is already in the ATM processing units (i.e., in unit 147). One of the streams is addressed to framer 111 in I/O module 30, and the other stream is addressed to framer 115 in I/O module 40. The two streams pass through ATM switch 100 and, thus, the information is delivered to framers 111 and 115 and flows out of fibers 210 and 230, respectively. The address information in ATM processing unit 147 is maintained in a memory within the processing unit, which memory is populated by CPU 157. CPU 157 obtains this information from controller 200 that is connected to ATM switch 100 through ATM bus 201 (and in this manner is able to reach any of the I/O modules). Controller 200 maintains information for the entire switch regarding the I/O modules to which service fibers and associated protection fibers are connected.

When a failure occurs, for example because of a loss of signal at the output of LIU 110, the detector in framer 111 sends a "loss of signal" trigger to CPU 150 on line 151 and, as in the prior art, CPU 150 takes corrective action. The corrective action process is depicted in FIG. 3.

Figure 3:
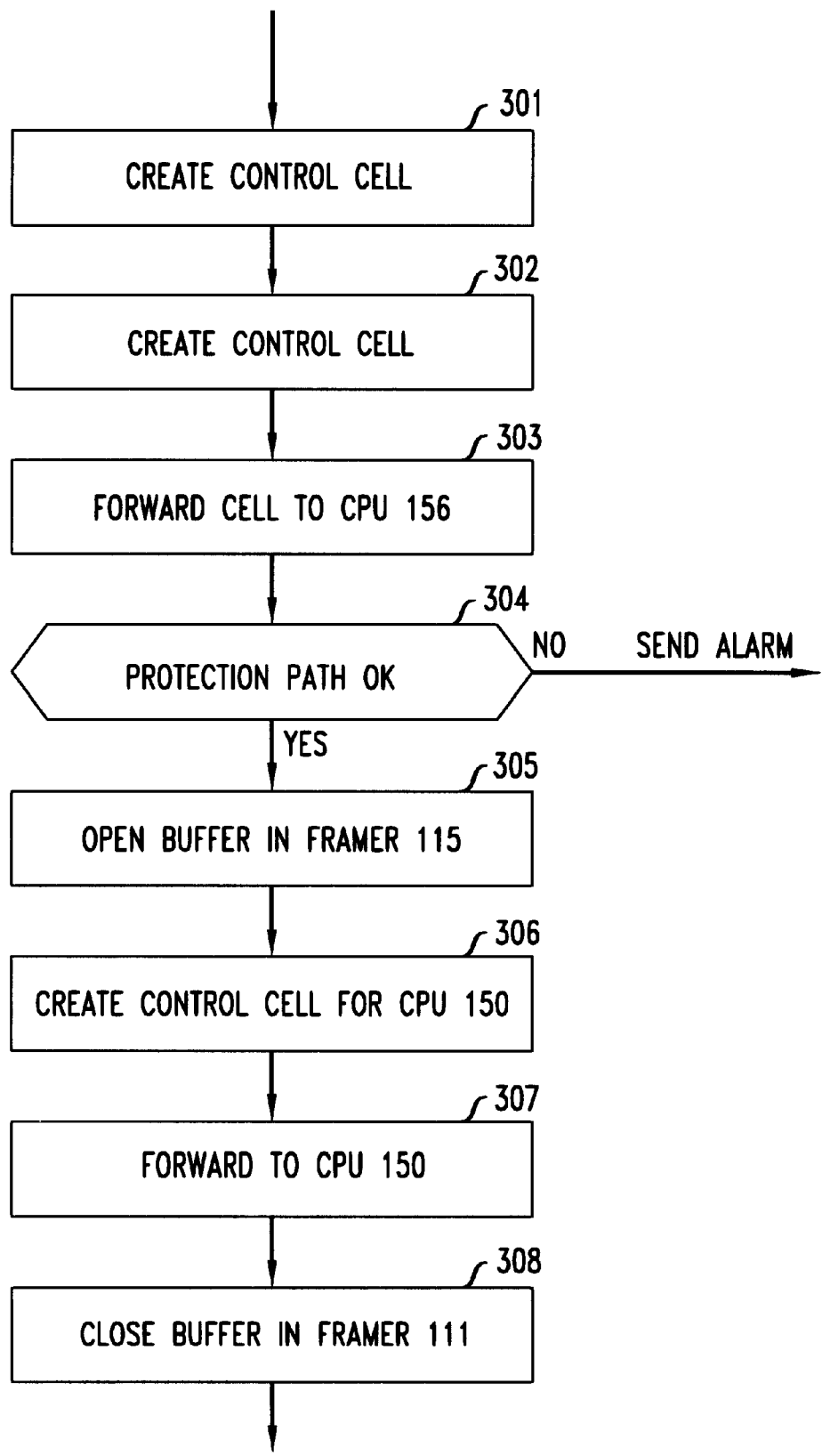
FIG. 3 is a flow chart of one process for switching operations from the service fiber to the protection fiber.

As shown in FIG. 3, in block 301 CPU 150 creates a control cell that is addressed to CPU 156. Control then passes to block 302, where the created cell is forwarded to ATM switch 100 via the ATM bus. Switch 100 forwards the created cell to CPU 156, again via the ATM bus, in block 303. In decision block 304, CPU 156 determines whether the protection path is in good operating order. If it is not, an alarm is sent out. Otherwise, control passes to block 305 where CPU 156 opens up the buffer in framer 115 via a control signal on bus 142. Control then passes to block 306, where CPU 156 creates a control cell that is addressed to CPU 150 and forwards it to ATM switch 100. In block 307 switch 100 forwards the control ATM cell to CPU 150, and lastly, in block 308 CPU 150 turns off the buffer of framer 111. The reverse direction remains unchanged.

Figure 4:
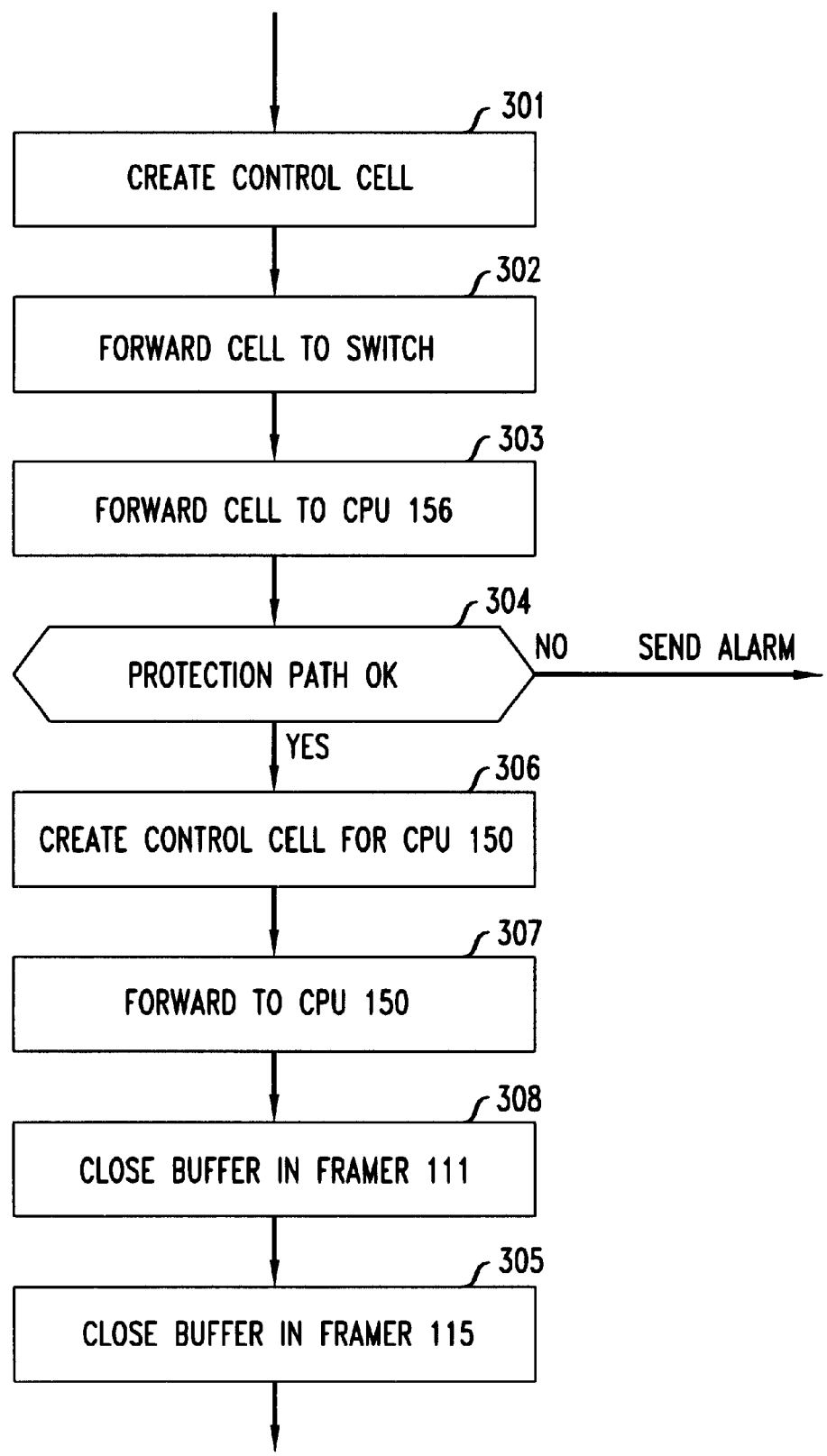
FIG. 4 is a flow chart of another process for switching operations from the service fiber to the protection fiber.

The above-described process is best suited for the failure condition where there is a loss of signal because the service line has no signal, and it is most important to open up the buffer of the protection line (i.e. of framer 115) as soon as possible. When the failure condition is that of a loss of framing, it is more important to close off the buffer of framer 111 first. Accordingly CPU 156 first creates a control ATM cell and launches it to CPU 150 to close off the buffer of framer 111. Thereafter, CPU 156 opens up the buffer of framer 115. This process is depicted in FIG. 4.

It may be worthwhile to reiterate here that the principles of this invention do not require a change in the conventional hardware that is employed. Aside from the change in connectivity that can be easily observed in FIG. 2, the other changes are software changes in the CPUs within the I/O modules and in controller 200. These changes are quite simple and well within the capabilities of just about any person skilled in the art.

The failure conditions that are mentioned above are loss of signal and loss of framing. Of course, it is also quite possible for the various hardware elements within an I/O module to fail. To guard against lost of service on the occurrence of such a condition, ATM modules include an oft-repeated self-diagnostic process that is controlled by the CPU (e.g., CPU 150). When a failure within a framer is recognized by the self-diagnostic process, the associated CPU directs its APS switch unit to switch the signal flow, as described above. Such action, if it can be effected, circumvents the failure. However, when the failure is in the APS switch unit or in the ATM processing unit, the CPU can merely raise an alarm by sending a control cell to controller 200.

In the FIG. 2 arrangement, in contradistinction, a failure condition even in the ATM processing unit may be circumvented, by using the process disclosed above. To illustrate, if ATM processing unit 140 fails and controller 200 recognizes that failure in the course of executing its self-diagnostics, the controller creates a control ATM cell that is addressed to CPU 156, and forwards the created control cell to ATM switch 100. One can easily see that the remainder of the process described in connection with FIGS. 3 and 4 can be carried out, and the switching from the service line to the protection line can be effected.

Even a failure within CPU 150 is not without remedy, because controller 200 is also engaged in repeated diagnostic measures. Every 500-msec controller 200 queries all of the I/O modules. If an I/O module fails to respond for three consecutive times, it is declared to be in a failed state, and controller 200 attempts to reset it. The resetting process closes all of the frame butters, so controller 200 can take charge and engage the protection line while the reset I/O module is successfully booted up, or replaced.

It should be realized that while FIG. 2 illustrates an arrangement where there is duplex operation on the right hand side of switch 100, and simplex operation on the left hand side of switch 100, that is not a limitation of the principles disclosed herein. It is quite simple to have an arrangement that includes duplex operation on the left-hand side as well. The only operation that may need to be highlighted in connection with duplex operation on both sides of and ATM switch 100 is that only one of the ATM processing units from one side needs to multi-cast its payload data to the other side of the ATM switch. It is, of course, the ATM processing unit that is associated with a framer that has an open buffer. The ATM processing unit that is associated with a framer that has a closed buffer does not multi-cast.

We claim:

1. A method executed in an arrangement where a service line from a remote location is connected to an input port of a first I/O module including a controllable gating element and having output port that is connected to a switch, and a protection line from said remote location is connected to an input port of a second I/O module including a controllable gating element and having an output port that is connected to said switch comprising the steps of:

in response to a condition whereby said first I/O module cannot provide viable data from said service line to said switch, said first I/O module communicating with said second I/O module via said switch regarding said condition; and controlling state of said gating element in said first I/O module and state of said gating element in said second I/O module in response to said step of communicating.

2. The method of claim 1 wherein said step of communicating comprises: said gating element in said first I/O module reporting to a CPU in said first I/O module of said condition, and said CPU in said first I/O module sending a message to a CPU in said second I/O module regarding said condition.

3. The method of claim 2 wherein said step of controlling comprises:

said CPU in said second I/O module checking-whether said protection line is capable of supplying viable data;

said CPU in said second I/O module sending a message to said CPU in said first I/O module, directing said CPU in said first I/O module to disable output of signals in said first I/O module; and then said CPU in said second I/O module enabling output of signals from said second I/O module.

4. The method of claim 2 wherein said step of controlling comprises:

said CPU in said second I/O module checking whether said protection line is capable of supplying viable data;

said CPU in said second I/O module enabling output of signals from said second I/O module; and then said CPU in said second I/O module sending a message to said CPU in said first I/O module, directing said CPU in said first I/O module to disable output of signals in said first I/O module.

5. A method for communicating data through a switch, where a service line from a remote location is connected to a first addressable port of said switch through a first I/O module that comprises a controllable gating element, where a protection line from said remote location is connected to a second addressable port of said switch through a second I/O module that comprises a controllable gating element, and where a third I/O module is connected to a third addressable port of said switch, said third I/O module comprising a multi-cast data replicator, said method comprising the steps of:

said replicator accepting said data received at an input port of said third I/O module;

through participation of said replicator, said third I/O module applying two streams of identical data to said switch, with a first stream of said two streams addressed to said first addressable port of said switch and a second stream of said two streams addressed to said second addressable port of said switch; where said protection line serves as an automatic backup to said service line.

6. The method of claim 5 wherein said step of said third I/O module applying two streams comprises the steps of:

referring to a memory for address information of said service line and said protection line;

forming one steam of data that is addressed to said first addressable port of said switch, based on said address information obtained in said step of referring to a memory;

forming a second stream of data that is addressed to said first addressable port of said switch, based on said address information obtained in said step of referring to a memory; and applying said first stream of data and said second stream of data to said switch.

7. An ATM arrangement comprising:

a service line from a remote destination connected to a first local I/O module;

a protection line from said remote destination, connected to a second local I/O module that is distinct from said first local I/O module, and an ATM switch connected to said first local I/O module and to said second local I/O module, where said protection line serves as an automatic backup to said service line wherein all communication between said first local I/O module and said second local I/O module is conducted via said ATM switch.

8. An ATM arrangement comprising:

a service line from a remote destination connected to a first local I/O module;

a protection line from said remote destination, connected to a second local I/O module that is distinct from said first local I/O module, and an ATM switch connected to said first local I/O module and to said second local I/O module, where said protection line serves as an automatic backup to said service line wherein said ATM switch includes a controller that is connected to said ATM switch, with said controller adapted to provide information to said first local I/O module and to said second local I/O module.

9. The arrangement of claim 8 wherein said controller provides information to said first local I/O module and to said second local I/O module via an ATM bus within said ATM switch.

10. An ATM arrangement comprising:

a service line from a remote destination connected to a first local I/O module;

a protection line from said remote destination, connected to a second local I/O module that is distinct from said first local I/O module, and an ATM switch connected to said first local I/O module and to said second local I/O module, where said protection line serves as an automatic backup to said service line wherein said protection line carries traffic into said second local I/O module that is identical to traffic that said service line carries into said first local I/O module.

11. An ATM arrangement comprising:

a service line from a remote destination connected to a first local I/O module;

a protection line from said remote destination, connected to a second local I/O module that is distinct from said first local I/O module, and an ATM switch connected to said first local I/O module and to said second local I/O module, where said protection line serves as an automatic backup to said service line wherein said switch provides payload data to said second I/O module for application to said service line that is identical to payload data that said switch provides to said first I/O module.

12. The arrangement of claim 11 wherein said payload data that is provided by said switch to said first I/O module is so provided in response to a first stream of data that is provided to said switch by a third I/O module and is addressed to said first I/O module, and wherein said payload data that is provided by said switch to said second I/O module is so provided in response to a second stream of data that is provided to said switch by said third I/O module and is addressed to said second I/O module.

13. The arrangement of claim 12 wherein said first stream and said second stream are created in said third I/O module.

14. The arrangement of claim 13 wherein said third I/O module creates said first stream and said second stream after obtaining address information about connection of said first I/O module and said second I/O module to said switch from a controller that is coupled to said third I/O module.

15. An ATM arrangement comprising:
a service line from a remote destination connected to a first local I/O module;
a protection line from said remote destination, connected to a second local I/O module that is distinct from said first local I/O module, and
an ATM switch connected to said first local I/O module and to said second local I/O module, where said protection line serves as an automatic backup to said service line where
said first I/O module includes a memory for buffering data arriving from said remote destination over said service line, and a controller for closing said memory to prevent said memory from delivering data outside said first I/O module; and
said second I/O module includes a memory for buffering data arriving from said remote destination over said protection line, and a controller for closing said memory to prevent said memory from delivering data outside said first I/O module;
wherein either the memory in said first I/O module is closed or the memory in said second I/O module is closed.

16. The arrangement of claim 15 where control messages to close and/or to open said memories flow through said ATM switch.

17. The arrangement of claim 16 where said control messages to close and/or to open said memories are initiated in response to a loss of signal or loss of framing by said first I/O module.

18. The arrangement of claim 16 where said control messages to close and/or to open said memories are initiated in response to detection of hardware failure within said first I/O module.

* * * * *